United States Patent
Urbutis

[11] 3,745,610
[45] July 17, 1973

[54] METHOD AND APPARATUS FOR SHIRRING DELICATE AND FRAGILE FOOD CASINGS

[76] Inventor: Aligmantas Povilas Urbutis, 6519 South Albany Avenue, Chicago, Ill. 60629

[22] Filed: Feb. 19, 1971

[21] Appl. No.: 117,062

Related U.S. Application Data

[62] Division of Ser. No. 797,423, Feb. 7, 1969, abandoned.

[52] U.S. Cl. .......................................... 17/42, 17/51
[51] Int. Cl. ............................................. A22c 13/00
[58] Field of Search ..................... 17/42, 45, 49, 52

[56] References Cited
UNITED STATES PATENTS

| 3,462,794 | 8/1969 | Martinek | 17/42 |
| 3,590,422 | 7/1971 | Matecki | 17/42 |

*Primary Examiner*—Lucie H. Laudenslager
*Attorney*—John F. Hohmann, Paul A. Rose et al.

[57] ABSTRACT

Continuous lengths of delicate and fragile food casings can be obtained by providing an increased pressure differential between the interior and exterior of inflated lengths of the food casings as they are being shirred.

3 Claims, 4 Drawing Figures

METHOD AND APPARATUS FOR SHIRRING DELICATE AND FRAGILE FOOD CASINGS

This application is a division of application Ser. No. 797,423 filed Feb. 7, 1969, now abandoned.

This invention relates to a new and improved method and apparatus for shirring continuous lengths of delicate and fragile food casings under controlled pressures. More particularly, this invention relates to a method and apparatus for controlling and regulating the inflation pressure and characteristics of a food casing as it is being shirred.

The food casings to which this invention relates are those generally obtained from such materials as collagen, aliginates, starches and the like, and which serve as molds, containers and wrappings for food products stuffed and processed therein.

A typical operation for producing continuous lengths of tubular food casings includes extruding a food casing material into a continuous, tubular length; conveying the food casing through a series of liquid treatment baths; drying and sizing the food casing; and then continuously shirring, compacting, severing and compressing the food casing to obtain relatively short and compact lengths of food casings commonly referred to in the art as "shirred casing sticks."

Processing thin-walled food casings, such as those obtained from collagen, is a delicate operation since freshly extruded collagenous tubing is very fragile, weak and porous. As a result, many problems are encountered in processing thin-walled collagenous tubing. For example, due to the porosity of collagenous tubing, the well-known "bubble method" cannot be employed to maintain it in an inflated state. Consequently, an inflating gas must be continuously supplied to the collagenous tubing in order to keep it inflated. The drying, sizing and shirring operations are, therefore, generally performed as a continuous process. In such a continuous process, an inflating gas, such as air, is usually supplied from a hollow shirring mandrel. However, since freshly extruded and wet collagenous tubing is weak and fragile, the inflating air pressure is kept very low.

In the art of producing shirred cellulosic food casing sticks, it is well known to supply inflating air at a pressure of from about 5 to 8 p.s.i. gauge from a hollow shirring mandrel to the tubular cellulose in order to impart to the wall of the tubular cellulose that degree of rigidity and stiffness which will enable it to be advanced over the shirring mandrel and permit the shirring members to grip the advancing tubing and form pleats therein. The pressure of the inflating gas upon the wall of the cellulosic tubing is an important factor since it affects the character and uniformity of the pleats formed in the tubing and also affects the compression and compacting of the shirred tubing into a shirred casing stick as well as the cohesion and integrity of the shirred casing stick. A tightly compressed shirred casing stick is necessary for its subsequent satisfactory handling and shipping.

In the manufacture of shirred collagenous casing sticks, a continuous length of extruded tubular collagen is continuously inflated with very low pressure air supplied from a hollow shirring mandrel. The inflating air is generally maintained at a constant and uniform internal air pressure above atmospheric pressure of from about 0.7 to 1.6 inches $H_2O$ (0.025 to 0.058 p.s.i. gauge) as the tubular collagen is being dried and sized. It has been found that these low internal air pressures are sufficient to inflate tubular collagen and maintain it in an inflated state during the drying-sizing process. Use of higher internal air pressures during drying and sizing has been found to adversely affect the sizing of the tubular collagen since it has a tendency to stretch beyond the desired size.

Although the softly inflated tubular collagen can be shirred at these very low air inflation pressures of from about 0.7 to 1.6 inches $H_2O$ (0.025 to 0.058 p.s.i. gauge), the shirred collagenous casing sticks obtained are limp, non-uniform and non-coherent. As a result, the shirred collagenous casing sticks produced are difficult to handle and frequently become decompacted; that is, the pleats formed during shirring become de-shirred and disassociated, so that they must be handled with great care during subsequent processing.

It has been found that when tubular collagen is shirred at higher internal pressures, such as about 140 times greater than the low pressure at which it must be dried and sized, shirred collagenous casing sticks can be obtained which exhibit significantly improved rigidity, uniformity and coherency. It has also been found that after the collagenous tubing has been dried and sized, it is not adversely affected by the use of such higher internal pressures. However, since inflation air at the very low pressure of from about 0.7 to 1.6 inches $H_2O$ must be supplied to the endless tubular collagen to inflate it as it is advanced through the continuous, uninterrupted process described above, prior attempts to increase the internal pressure of tubular collagen as it is shirred without adversely affecting its characteristics during the drying and sizing steps of the process have not been successful.

It is an object of this invention, therefore, to provide a method and apparatus for increasing the effective internal pressure of delicate and fragile tubular food casings as they are being shirred without affecting their characteristics during drying and sizing so that shirred casing sticks can be readily obtained which exhibit improved rigidity, uniformity and coherency.

This and further objects of the invention will become apparent from the ensuing discussion.

The objects of the invention can be attained by providing, in general, means for creating an increased pressure differential between the interior and the exterior of tubular collagen as it is being shirred so that its effective net internal pressure is substantially increased.

The term "uniformity," as used throughout the specification and in the appended claims, is intended to refer to and should be understood as referring to the physical features, properties and characteristics of shirred casing sticks which are exemplified by, but not limited to, the uniformity of the bore size, circumference, length and pleat formation. Similarly, the term "coherency," as used throughout the specification and in the appended claims, is intended to refer to and should be understood as referring to shirred casing sticks that are characterized as being self-supporting and durable and which can be handled without becoming decompacted. Additionally, the term "pressure differential" as employed throughout the specification and in the appended claims is intended to refer to and should be understood as referring to the difference between the pressure inside and the pressure outside the wall of a tubular casing.

The invention will become more clear when considered together with the accompanying drawing wherein.

Figure 1:
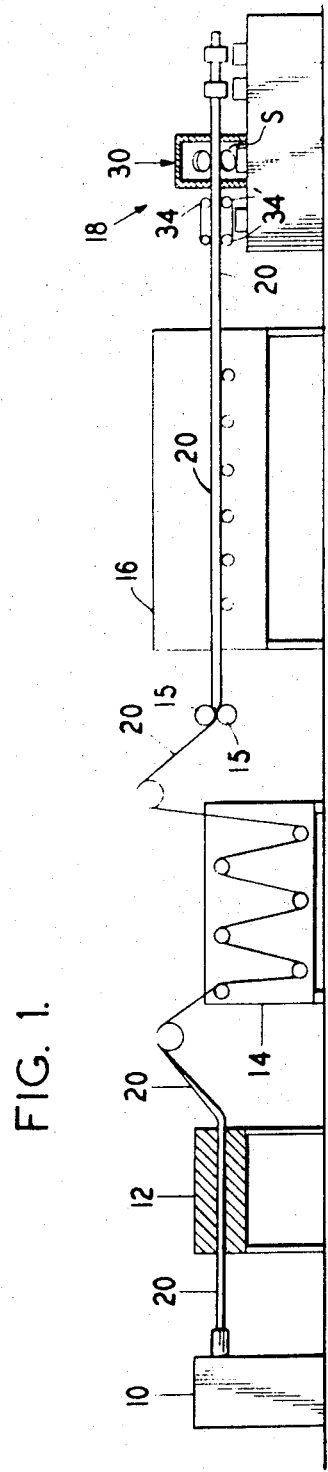
FIG. 1 is a schematic side elevational view, part in section and part broken away, illustrating the apparatus of the invention and a typical apparatus utilized to fabricate and process continuous lengths of tubular casing.

Turning now to the drawing, there is shown in FIG. 1 an extruder 10 from which a continuous length of tubular material such as collagen 20 is formed and extruded whereupon it is conveyed through a liquid treatment tank 14 where it is subjected to liquid baths which further develop the tubular collagen 20. Since freshly extruded tubular collagen 20 exhibits a low degree of cohesiveness and tubular wall strength, it is generally conveyed through a pre-dryer unit 12 so that some degree of cohesiveness, rigidity and strength can be imparted to it enabling it to withstand the stresses and strains of subsequent processing without breaking, tearing or being otherwise adversely affected.

After the tubular collagen 20 emerges from the liquid treatment tank 14, it is inflated with a gaseous medium such as air and then conveyed in an inflated state through a drying-sizing unit 16. The tubular collagen 20 is dried to a predetermined moisture content and sized so that its diameter, elongation and extensibility characteristics become substantially fixed within narrow, predetermined, dimensional limits. After being dried and sized, the inflated tubular collagen 20 is advanced to a shirring apparatus, generally designated by reference numeral 18, where it is shirred, compacted, severed and compressed to obtain shirred casing sticks.

The shirring means S of the shirring apparatus 18 is enclosed in a substantially air-tight chamber generally denoted by reference numeral 30. As can be seen more clearly in FIG. 2, chamber 30 is secured to the support frame 31 of a shirring machine to which there is also mounted a hollow shirring mandrel 32 over which the inflated tubular collagen 20 is advanced to be shirred.

Figure 4:
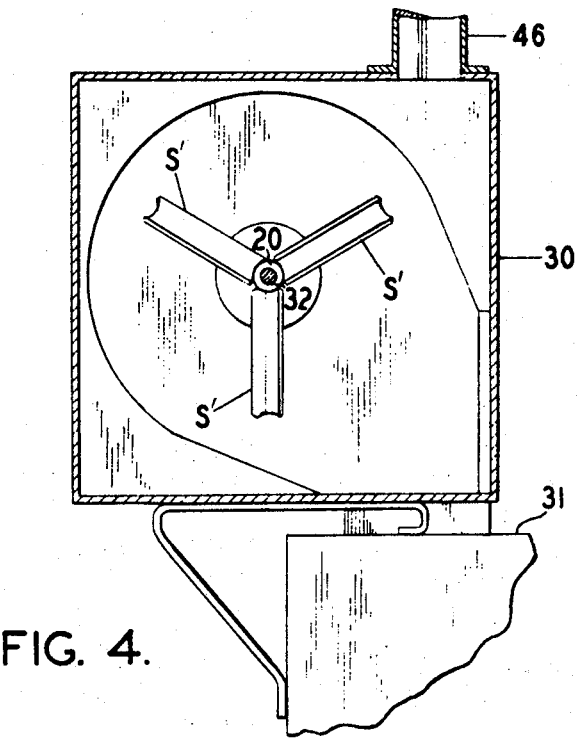

The shirring means S in chamber 30 comprises a plurality of shirring elements S' (FIG. 4) and can be the type disclosed and described in U.S. Pat. No. 2,983,949 to Matecki. As described therein, the shirring means comprises a plurality of cogged wheels axially aligned about the circumference of a shirring mandrel. These cogged wheels act to engage and then pleat, concurrently shirr and compact, and then advance a length of tubular material which is subsequently severed and compressed into shirred casing sticks.

Figure 2:
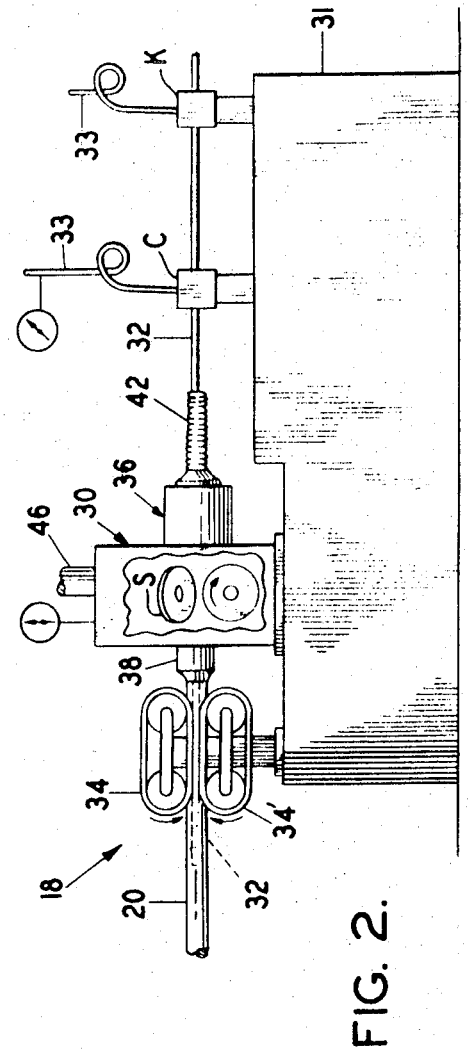
FIG. 2 is a side elevational view of the shirring means of the apparatus of FIG. 1.

As shown in FIG. 2, the shirring mandrel 32 is centered with respect to the shirring means S by means of clamps C and K. Flexible conduits 33 are connected to clamps C and K and air is conveyed through them from an accurately regulated source of low pressure air supply (not shown) to and through the hollow mandrel 32 in order to inflate the tubular collagen 20. The tubular collagen 20 is inflated before being advanced through the dryer-sizing unit 16 such as at nip rolls 15 (FIG. 1). A pair of feed belts 34, 34' (FIG. 2) are utilized to grip and advance the inflated length of tubular collagen 20 over mandrel 32 and advance it to and through the shirring means S.

Figure 3:
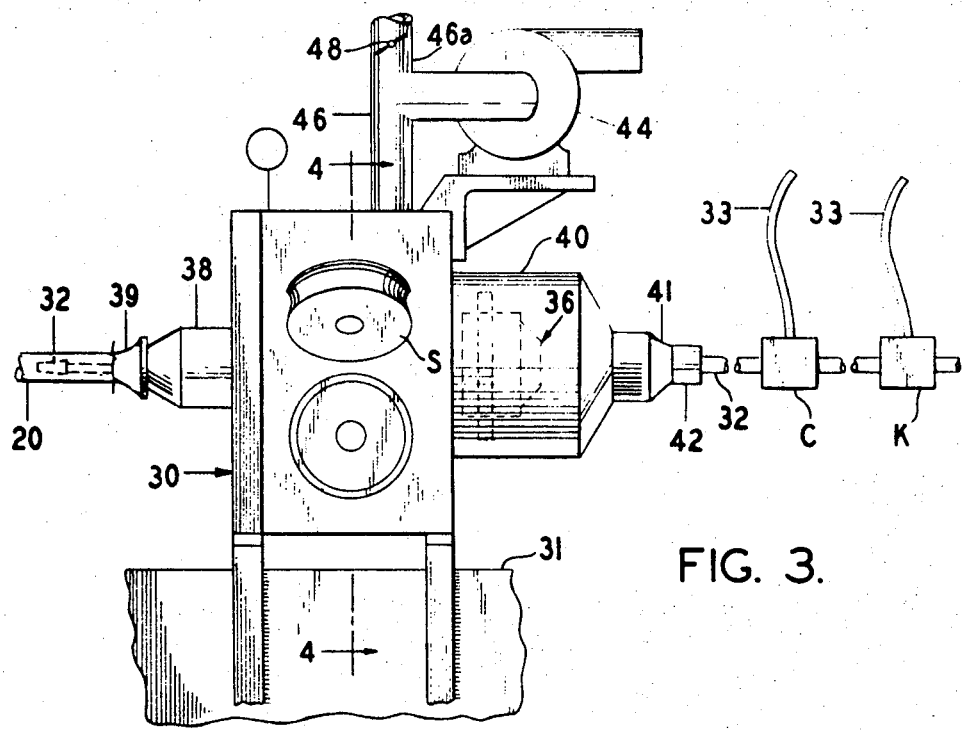
FIG. 3 is an enlarged side elevational view, part in section and part in phantom, showing a part of the shirring apparatus of FIG. 2; and, FIG. 4 is a view taken through line 4—4 of FIG. 3.

As shown in more detail in FIG. 3, the inlet and outlet sides of chamber 30 are equipped with a pair of air seals 38 and 40, respectively, each of which are provided with annular lips 39,41. The annular lips 39,41 of air seals 38,40 engage the tubular collagen 20 as it is conveyed therethrough thereby providing a substantially air-tight passage. The outlet air seal 40 also envelops and positions a casing holdback or compacting means, generally denoted by reference numeral 36, which can be of the type disclosed and described in the above-identified U.S. patent to Matecki and in U.S. Pat. No. 3,397,069 to Urbutis. An air pump 44 secured to support means 31 is utilized to adjust the ambient pressure in chamber 30 through conduit 46 which communicates with the interior of chamber 30. Conduit 46 is provided with a branch conduit 46a which is equipped with a damper 48 by which the ambient air pressure in chamber 30 can be regulated and/or controlled.

A typical operation of the apparatus of the invention will now be described and will be more fully comprehended when considered together with the accompanying drawing.

Low pressure air of from about 0.7 to 1.6 inches $H_2O$ above atmospheric pressure is continuously admitted through hollow mandrel 32 and into a continuous length of tubular collagen 20 so that it is inflated from the hollow mandrel 32 to and through the dryer-sizing unit 16 to a point between the dryer-sizing unit 16 and the liquid treatment tank 14, such as at nip rolls 15, and remains in an inflated state as it is conveyed to and through the drying-sizing unit 16 (FIG. 1). The continuous supply of low pressure inflating air is provided by means of a conventional air pump (not shown) delivering air to and through hollow mandrel 32 from clamps C and K and flexible conduits 33 (FIGS. 2 and 3).

After being dried and sized, the inflated tubular collagen 20 is conveyed from the drying-sizing unit 16 and advanced to the shirring means 18 in chamber 30.

The ambient air pressure in shirring chamber 30 (FIGS. 2 and 3) is reduced by closely regulating it to be less than atmospheric pressure until the effective pressure exerted upon the wall of the tubular collagen 20 contained in the shirring chamber 30 is from about 3 to 9 psi. (80 to 250 inches $H_2O$), preferably from about 3 to 5 psi. (80 to 140 inches $H_2O$). Thus the preferred effective pressure exerted on the wall of the tubular collagen 20 in shirring chamber 30 is from about 80 to 140 times greater than the preferred low inflation air pressure of from about 0.7 to 1.6 inches $H_2O$ required in the drying-sizing steps of the continuous process.

The preferred effective pressure (80 to 140 inches $H_2O$) exerted on the wall of the tubular collagen 20 is attained by drawing a vacuum on shirring chamber 30 by means of air pump 44 acting through conduits 46 and 46a which are regulated by damper 48 (FIGS. 2 and 3) until the ambient air pressure in chamber 30 is about 5.0 psi. (140 inches $H_2O$) below atmospheric pressure.

It will be noted that although the absolute air pressure in shirring chamber 30 can be readily increased or decreased, the inflating air continuously being admitted into the tubular collagen 20 is maintained constant at the initial pressure level of from about 0.7 to 1.6 inches H$_2$O (0.025 to 0.057 psi.) above atmospheric pressure.

It has been found that by maintaining an effective air pressure differential of from about 3 to 9 psi. (80 to 250 inches H$_2$O) on the wall of the inflated tubular collagen 20 as it is being shirred and compacted, shirred collagen casing sticks can be obtained which exhibit significantly improved uniformity and coherency as well as substantially increased strength and rigidity.

It will become apparent to those practicing the invention and to those skilled in the art that one or more airtight chambers can be provided intermediate the shirring chamber and the dryer-sizing unit so that the tubular collagen can be gradually exposed to an increased pressure differential before it enters the shirring chamber.

What is claimed is:

1. An apparatus for shirring continuous lengths of tubular food casing comprising, in combination:
    a. means to continuously inflate a continuous length of tubular food casing at a pressure sufficient to maintain the tubular food casing in an inflated state;
    b. means to advance an inflated length of the tubular food casing to a shirring apparatus to be shirred; and
    c. means to increase the effective pressure exerted on the wall of an inflated length of tubular food casing as it is being shirred comprising a substantially airtight chamber which encloses the shirring apparatus and which is equipped with means for regulating the air pressure in the air-tight chamber such that a rigid, substantially uniform, cohesive shirred casing stick is obtained.

2. An apparatus for shirring continuous lengths of tubular food casing comprising, in combination:
    a. means to continuously inflate a continuous length of tubular food casing at a pressure sufficient to maintain the tubular food casing in an inflated state;
    b. means to advance an inflated length of tubular food casing to a shirring apparatus having shirring means for shirring tubular food casing;
    c. means to increase the effective net internal pressure exerted on the wall of an inflated length of tubular food casing as it advances through the shirring means of said shirring apparatus without increasing inflation pressure on the wall of an inflated length of tubular casing advancing to the shirring apparatus.

3. The apparatus of claim 2 wherein the means for increasing the effective net internal pressure comprises enclosing the shirring means of said shirring apparatus within a chamber having means for regulating the pressure within the chamber.

* * * * *